US008619020B2

(12) United States Patent
Jeon et al.

(10) Patent No.: US 8,619,020 B2
(45) Date of Patent: Dec. 31, 2013

(54) DISPLAY APPARATUS (75) Inventors: Jee-Hoon Jeon, Hwaseong-si (KR);
Hyoung Sik Nam, Incheon (KR);
Jae-Ho Oh, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 929 days.

(21) Appl. No.: 12/752,463

(22) Filed: Apr. 1, 2010

(65) Prior Publication Data

US 2011/0115724 A1 May 19, 2011

(30) Foreign Application Priority Data

Nov. 16, 2009 (KR) .................. 10-2009-0110468

(51) Int. Cl.
*G09G 3/36* (2006.01)
*G09G 5/00* (2006.01)
*G06F 3/041* (2006.01)

(52) U.S. Cl.
USPC ........................... 345/104; 345/156; 345/173

(58) Field of Classification Search
USPC .................. 345/87–104, 204–215, 690–699,
345/156–184; 178/18.01–20.04
See application file for complete search history.

(56) References Cited

U.S. PATENT DOCUMENTS

| 6,239,788 | B1 * | 5/2001 | Nohno et al. | 345/173 |
|---|---|---|---|---|
| 7,737,957 | B2 * | 6/2010 | Lee et al. | 345/173 |
| 7,800,602 | B2 * | 9/2010 | Choi et al. | 345/207 |
| 7,973,777 | B2 * | 7/2011 | Lee et al. | 345/175 |
| 2005/0275616 | A1 * | 12/2005 | Park et al. | 345/102 |
| 2006/0017710 | A1 * | 1/2006 | Lee et al. | 345/173 |
| 2006/0132463 | A1 * | 6/2006 | Lee et al. | 345/173 |
| 2006/0164361 | A1 * | 7/2006 | Yi | 345/96 |
| 2007/0001965 | A1 * | 1/2007 | Lee | 345/96 |
| 2009/0237340 | A1 * | 9/2009 | Park et al. | 345/90 |
| 2010/0079401 | A1 * | 4/2010 | Staton | 345/174 |

FOREIGN PATENT DOCUMENTS

| JP | 2007-102759 | 4/2007 |
|---|---|---|
| KR | 1020080038176 | 5/2008 |
| KR | 1020090082634 | 7/2009 |

* cited by examiner

*Primary Examiner* — Alexander Eisen
*Assistant Examiner* — Patrick F Marinelli
(74) *Attorney, Agent, or Firm* — F. Chau & Associates, LLC (57) ABSTRACT

A display apparatus includes a display panel, a plurality of sensors, a read-out circuit, and a control circuit. The display panel includes a plurality of pixels receiving a data signal having a polarity reversed with respect to a common voltage to display an image. The sensors sense light to output sensing signals. The sensors may be integrated into the display panel. The read-out circuit is charged with the sensing signals generating charged signals in response to a sampling signal generated during a period in which the common voltage has a predetermined reference voltage level. The control circuit calculates a position on the display panel from the charged signals received signals from the read-out circuit.

18 Claims, 11 Drawing Sheets

DISPLAY APPARATUS

CROSS-REFERENCE TO RELATED APPLICATION

This application claims priority to Korean Patent Application No. 2009-110468, filed on Nov. 16, 2009, the disclosure of which is incorporated by reference in its entirety herein.

BACKGROUND

1. Technical Field

Embodiments of the present invention relate to a display apparatus, and more particularly to a display apparatus having a display panel including sensors.

2. Discussion of Related Art

An image display apparatus that includes a touch panel does not require a separate external input device (e.g., a keyboard, a mouse, etc.). The touch panel may be disposed on a liquid crystal display panel displaying an image to receive positional information from a touch of a user. This positional information may be used to enter commands to control the display. For example, when a menu of command choices is displayed, the positional information may be used to determine which command to execute. When the touch panel is a separate panel from the liquid crystal display panel, optical characteristics of the liquid crystal display (e.g., brightness, viewing angle, etc.) may deteriorate. Further, the separate panel tends to increase the thickness of the liquid crystal display, which may not be desirable.

SUMMARY

At least one exemplary embodiment of the present invention includes a display apparatus capable of preventing a distortion of a sensing signal in a display panel with integrated sensors to improve sensing accuracy.

According to an exemplary embodiment of the invention, a display apparatus includes a display panel, a plurality of sensors, a read-out circuit, and a control circuit. The display panel includes a plurality of pixels receiving a data signal having a polarity reversed with respect to a common voltage to display an image, and the sensors sense light to output sensing signals. The read-out circuit is charged with the sensing signals to generate charge signals in response to a first sampling signal generated during a period in which the common voltage has a predetermined reference voltage level. The control circuit receives the charged signals to calculate a position on the display panel based on the received signals.

The position on the display panel may correspond to the position of the light on the display panel. The light may be an infrared light that is emitted from a backlight passing, where some portion of the light passes through the display panel. For example, when an object (e.g., a finger, stylus, etc.) touches the display panel, that portion of the light may be reflected by the object onto one or more of the sensors.

According to an exemplary embodiment of the invention, a display apparatus includes a display panel, a plurality of sensors, a sensor driver, a normal signal generator, and a control circuit. The display panel includes a plurality of pixels to display an image, and the sensors sense light output first sensing signals. The sensor driver sequentially provides a scan signal to the sensors during an n-th sensing frame among a plurality of sensing frames and stops providing the scan signal during an (n+1)-th sensing frame among the sensing frames. The normal signal generator receives the first sensing signals from the sensors during the n-th sensing frame, receives noise signals from the sensors during the (n+1)-th sensing frame, and subtracts the noises signals from the first sensing signals to output second sensing signals. The control circuit receives the second sensing signals to calculate a position on the display panel based on the second sensing signals.

According to an exemplary embodiment of the invention, a display apparatus includes a display panel, a data driver, a timing controller, a plurality of sensors, a read-out circuit, and a control circuit. The display panel includes a plurality of pixels each receiving a data signal to display an image. The data driver reverses a polarity of the data signal with respect to the common voltage based on a polarity reversal signal. The timing controller controls a period of the polarity reversal signal based on a selection signal. The sensors sense light to output sensing signals. The read-out circuit receives the sensing signals from the sensors. The control circuit receives the sensing signals from the read-out circuit to calculate a position on the display panel based on the sensing signals.

The sensors may be integrated into at least one of the above display panels. At least one of the above read-out circuits may be charged with the sensing signals in response to a first sampling signal generated corresponding to a reference level period during which a common voltage of the display panel has a predetermined reference voltage level.

Thus, at least one of the above control circuits may calculate position information with normal sensing signals read-out in a period during which the common voltage applied to the display panel is not distorted, thereby improving sensing accuracy.

BRIEF DESCRIPTION OF THE DRAWINGS

Embodiments of the present invention will become readily apparent by reference to the following detailed description when considered in conjunction with the accompanying drawings wherein.

DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Hereinafter, embodiments of the present invention will be explained in detail with reference to the accompanying drawings.

Figure 1:
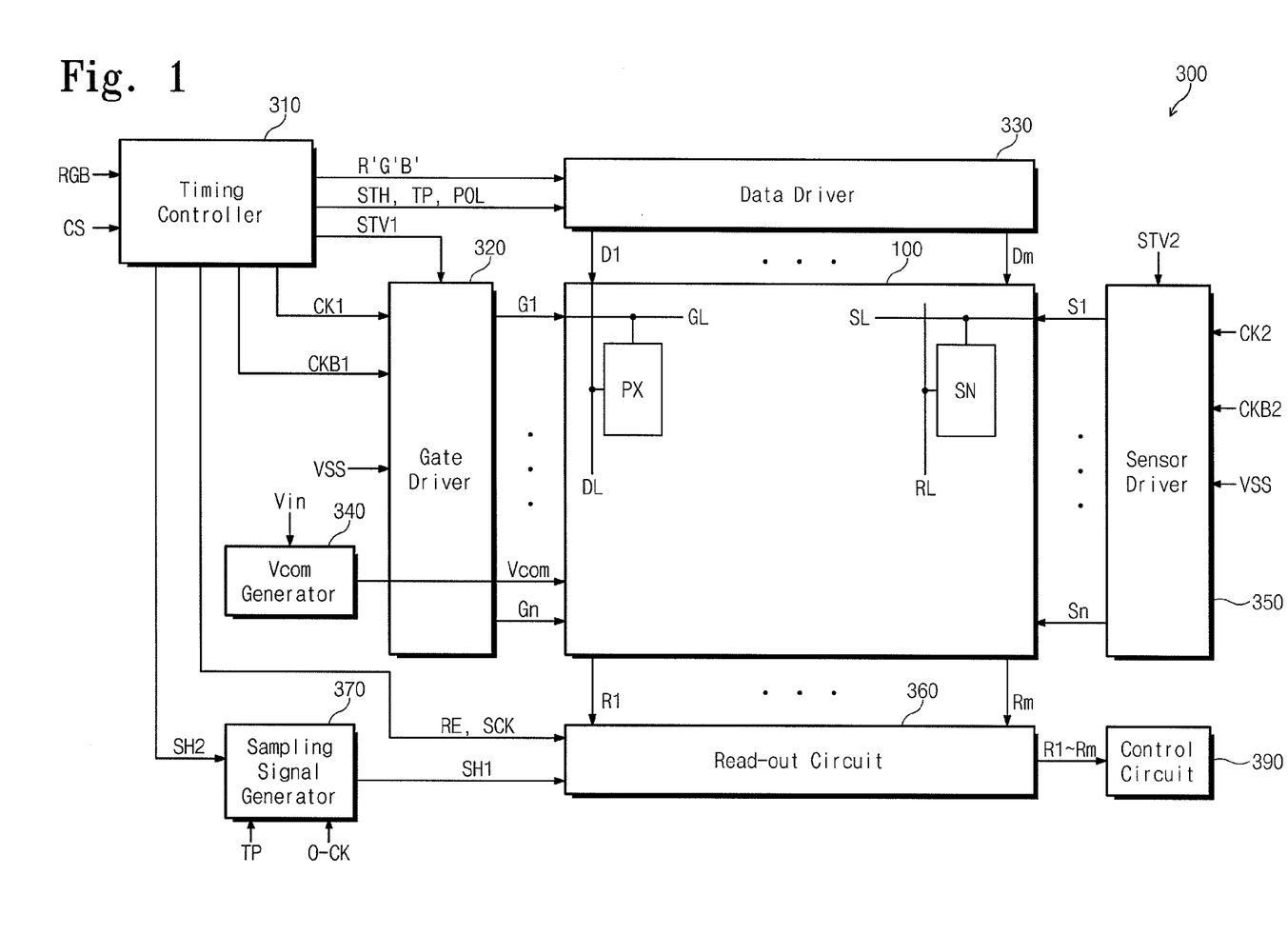
FIG. 1 is a block diagram showing a display apparatus according to an exemplary embodiment of the present invention.
Figure 2:
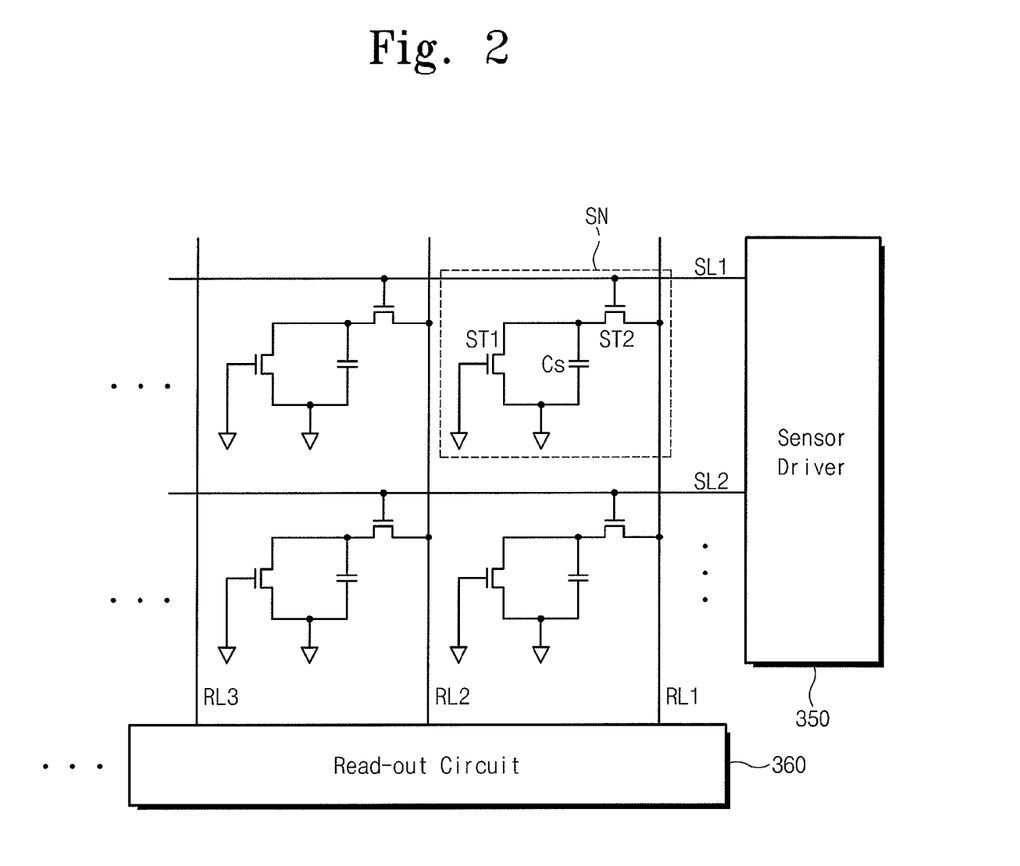
FIG. 2 is a circuit diagram of sensors of FIG. 1 according to an exemplary embodiment of the present invention.

FIG. 1 is a block diagram showing a display apparatus according to an exemplary embodiment of the present invention. FIG. 2 is a circuit diagram of sensors of FIG. 1. Referring to FIG. 1, a display apparatus 300 includes a display panel 100, a timing controller 310, a gate driver 320, a data driver 330, a common voltage generator (hereinafter, referred to as Vcom generator) 340, a sensor driver 350, a read-out circuit 360, a sampling signal generator 370, and a control circuit 390.

The timing controller 310 receives a plurality of image signals RGB and a plurality of control signals CS. The image signals RGB and the control signals CS may be received from a source external to the display apparatus 300. The timing controller 310 converts a data format of the image signals RGB into a data format appropriate to interface between the timing controller 310 and the data driver 330 and provides the converted image signals R'G'B' to the data driver 330. In addition, the timing controller 310 provides data control signals (e.g., an output start signal TP, a horizontal start signal STH, a polarity reversal signal POL, etc.) to the data driver 330 and provides gate control signals (e.g., a vertical start signal STV1, a vertical clock signal CK1, a vertical clock bar signal CKB1, etc.) to the gate driver 320.

The gate driver 320 may sequentially output gate signals G1~Gn to gate lines of the display panel 100 in response to the gate control signals STV1, CK1, and CKB1 from the timing controller 310.

The data driver 330 converts the image signals R'G'B' into data voltages D1~Dm in response to the data control signals (e.g., TR STH, and POL) from the timing controller 310 and outputs the data voltages D1~Dm to data lines of the display panel 100.

The display panel 100 includes a plurality of pixels PX and a plurality of sensors SN. For example, the pixels PX and the sensors SN are integrated into the display panel 100. The display panel 100 may include a lower substrate, an upper substrate facing the lower substrate, and a liquid crystal layer disposed between the lower substrate and the upper substrate. For example, the pixels PX may be arranged on the lower substrate and the sensors SN may be arranged on the upper substrate. The pixels PX have the same structure and function, and thus one pixel will be described as a representative example.

The lower substrate may include a plurality of gate lines GL, a plurality of data lines DL crossing the gate lines GL, and the pixels PX. Each of the pixels PX may include a thin film transistor, a liquid crystal capacitor, and a storage capacitor. The thin film transistor includes a gate electrode connected to a corresponding gate line of the gate lines GL, a source electrode connected to a corresponding data line of the data lines DL, and a drain electrode connected to the liquid crystal capacitor and the storage capacitor.

The gate lines GL are connected to the gate driver 320 and the data lines DL are connected to the data driver 330. The gate lines GL receive the gate signals G1~Gn from the gate driver 320 and the data lines DL receive the data voltages D1~Dm from the data driver 330.

The thin film transistor of each pixel PX is turned on in response to the gate signal provided to the corresponding gate line, and the data voltage provided to the corresponding data line is applied to a pixel electrode of the liquid crystal capacitor through the turned-on thin film transistor. A common electrode of the liquid crystal capacitor receives a common voltage Vcom. The common electrode may be arranged on the upper substrate. The common voltage generator 340 converts an input voltage Vin into the common voltage Vcom (e.g., a direct-current (DC) voltage) to apply the common voltage Vcom to the common electrode. Accordingly, the liquid crystal capacitor is charged with a voltage corresponding to an electric potential between the common voltage Vcom and the data voltage. Each of the pixels PX controls a light transmittance in accordance with the size of the voltage charged in the liquid crystal capacitor to display the image.

If the data voltages D1~Dm having the same polarity are continuously applied to the pixels PX, the liquid crystal layer may deteriorate. Accordingly, the data driver 330 may periodically reverse the polarity of the data voltages D1~Dm in one image frame unit with respect to the common voltage Vcom in response to the polarity reversal signal POL.

The upper substrate may include a plurality of scan lines SL, a plurality of read-out lines RL crossing the scan lines SL, and the sensors SN. In at least one exemplary embodiment, the sensors SN have the same structure and function, and thus one sensor will be described with reference to FIG. 2 as a representative example. For the convenience of explanation, first and second scan lines SL1 and SL2 among the scan lines SL and first, second, and third read-out lines RL1, RL2, and RL3 among the read-out lines RL have been shown in FIG. 2.

Referring to FIG. 2, each of the sensors SN includes a sensor transistor ST1, a switching transistor ST2, and a capacitor Cs. For example, the switching transistor ST2 includes a first electrode (e.g., a gate electrode) connected to a corresponding scan line (e.g., SL1 among the scan lines SL), a second electrode connected to a corresponding read-out line (e.g., RL1) among the read-out lines RL, and a third electrode connected to the capacitor Cs and the sensor transistor ST1. For example, sensors SN of the first row may be connected to the first scan SL1, sensors SN of the second row may be connected to the second scan line SL2, etc. For example, sensors SN of the last column may be connected to the first read-out line RL1, sensors of the next to last column may be connected to the second read-out line RL2, etc.

The capacitor Cs includes a first electrode connected to the third electrode of the switching transistor ST2 and a second electrode connected to receive a ground voltage. The sensor transistor ST1 includes a first electrode connected to receive a bias voltage, a second electrode (e.g., a gate electrode) connected to receive the ground voltage, and a third electrode connected to the first electrode of the capacitor Cs.

The sensor transistor ST1 senses light (e.g., from an external light source) and outputs a sensing signal corresponding to a light amount of the sensed light. A more detailed description of the light provided to the sensor transistor ST1 will be described below with reference to FIGS. 11 and 12.

A voltage charged in the capacitor Cs increases by the sensing signal output from the sensor transistor ST1. For example, as the amount of the light incident to the sensor transistor ST1 increases, the voltage charged in the capacitor Cs increases.

The scan lines SL are connected to the sensor driver 350, which enables the sensor driver 350 to sequentially receive a plurality of scan signals S1~Sn. The sensor driver 350 receives sensor control signals (e.g., a start signal STV2, a first clock signal CK2, a second clock signal CKB2, etc.)

from the timing controller 310 and may sequentially output the scan signals S1~Sn. The sensor control signals (e.g., STV2, CK2, and CKB2) may be synchronized with the gate control signals (e.g., STV1, CK1, and CKB2).

The read-out lines RL are connected to the read-out circuit 360 and each provides the voltage charged in a corresponding sensor SN among the sensors SN to the read-out circuit 360. For example, when the switching transistor ST2 in each sensor SN is turned on in response to the corresponding scan signal, each of the sensors SN provides the voltage charged in the capacitor Cs thereof to the corresponding read-out line RL through a turned on switching transistor ST2.

The read-out circuit 360 is charged with sensing voltages R1~Rm from the read-out lines RL in response to the control signals (e.g., RE and SCK) from the timing controller 310 and a first sampling signal SH1, and the sensing voltages R1~Rm charged in the read-out circuit 360 may be sequentially applied to the control circuit 390. The sampling signal generator 370 generates the first sampling signal SH1 based on a second sampling signal SH2 output from the timing controller 310. The read-out circuit 360 and the sampling signal generator 370 will be described in more detail later.

The control circuit 390 generates a 2-dimensional coordinate value indicating a point (or location) where a user's finger (or other object) touches the display based on a timing at which the scan signals occur and the sensing voltages.

Figure 3:
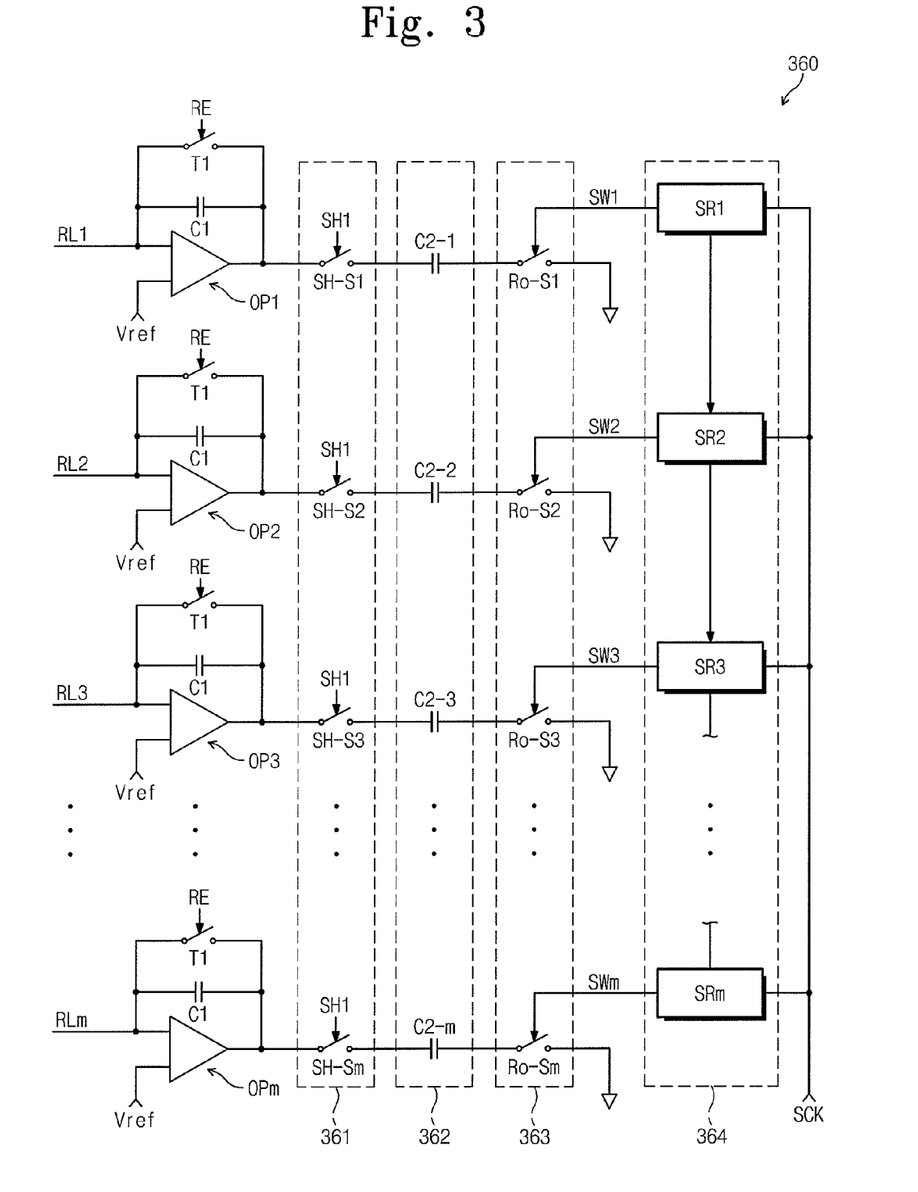
FIG. 3 is a circuit diagram of a read-out circuit of FIG. 1 according to an exemplary embodiment of the present invention.
Figure 4:
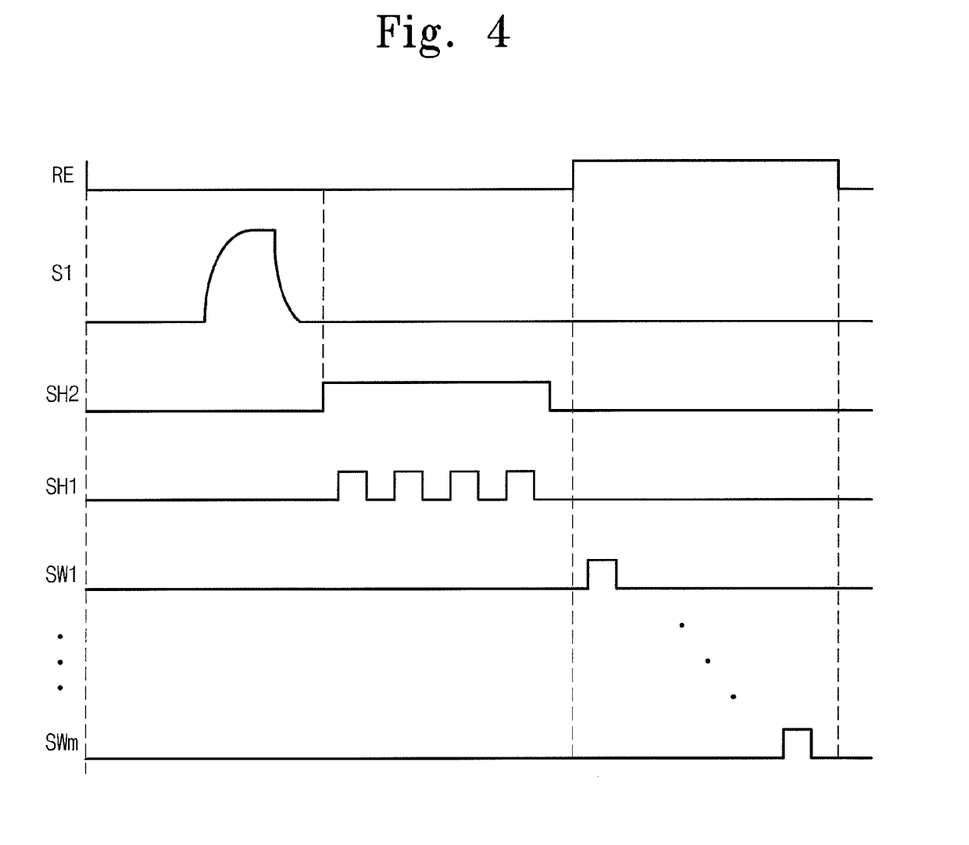
FIG. 4 is a timing diagram of exemplary signals of FIG. 3.

FIG. 3 is a circuit diagram of a read-out circuit of FIG. 1 according to an exemplary embodiment of the invention, and FIG. 4 is a timing diagram of exemplary signals of FIG. 3. Referring to FIGS. 3 and 4, the read-out circuit 360 includes a plurality of operational amplifiers OP1~OPm, a sampling part 361, a charging part 362, a read-out part 363, and a shift register 364.

Each of the operational amplifiers OP1~OPm is connected to the corresponding read-out line among the read-out lines RL1~RLm through a first input terminal thereof to receive a corresponding sensing voltage among the sensing voltages R1~Rm from the corresponding sensor among the sensors SN. In addition, each of the operational amplifiers OP1~OPm receives a reference voltage Vref through a second input terminal thereof. Each of the operational amplifiers OP1~OPm may receive the corresponding sensing voltage from the corresponding read-out line after the corresponding scan signal is applied to the corresponding sensor.

A capacitor C1 and a switching device T1 are connected in parallel between an output terminal and the first input terminal in each operational amplifier OP1~OPm. The switching device T1 receives a reset signal RE from the timing controller 310 and is open during a first logic state (e.g., a logic low) of the reset signal RE and closed during a second logic state (e.g., a logic high) of the reset signal RE. For example, if the sensing voltages R1~Rm are greater than the reference voltage Vref during the logic low state of the reset signal RE, each of the operational amplifiers OP1~OPm gradually increases an output voltage output from the output terminal thereof.

The sampling part 361 includes a plurality of sampling switching devices SH-S1~SH-Sm each connected to the output terminal of the corresponding operational amplifier among the operational amplifiers OP1~OPm. The first sampling signal SH1 is applied to the sampling switching devices SH-S1~SH-Sm. For example, the sampling switching devices SH-S1~SH-Sm are closed during a logic period (e.g., a logic high period) of the first sampling signal SH1 and the output voltages from the operational amplifiers OP1~OPm are provided to the charging part 362 through the sampling switching devices SH-S1~SH-Sm. In at least one exemplary embodiment of the invention, the high period of the first sampling signal SH1 is present between a falling time of the scan signal S1 and a rising time of the reset signal RE.

The charging part 362 includes a plurality of capacitors C2-1~C2-m respectively connected to the sampling switching devices SH-S1~SH-Sm. Thus, the capacitors C2-1~C2-m may be charged with the output voltages during the high period of the first sampling signal SH1.

The read-out part 363 includes a plurality of read-out switching devices Ro-S1~Ro-Sm connected to the capacitors C2-1~C2-m in a one-to-one correspondence, and the shift register 364 sequentially outputs switching signals SW1~SWm to control the read-out switching devices Ro-S1~Ro-Sm. The shift register 364 includes a plurality of stages SR1~SRm and sequentially outputs the switching signals SW1~SWm in response to the sensing clock signal SCK provided from the timing controller 310 through the stages SR1~SRm. In at least one exemplary embodiment of the invention, the switching signals SW1~SWm are sequentially output during the high period of the reset signal RE.

Responsive to the switching signals SW1~SWm that are sequentially output from the shift register 364, the read-out switching devices Ro-S1~Ro-Sm are sequentially closed to sequentially provide the voltages charged in the capacitors C2-1~C2-m to the control circuit 390. Accordingly, the control circuit 390 may sequentially receive the sensing voltages R1~Rm that are sensed by the sensors SN included in one row of the display panel 100.

As shown in FIG. 4, the high period of the first sampling signal SH1 is present in the high period of the second sampling signal SH2. A process of generating the first sampling signal SH1 based on the second sampling signal SH2 will be described below in detail.

Figure 5:
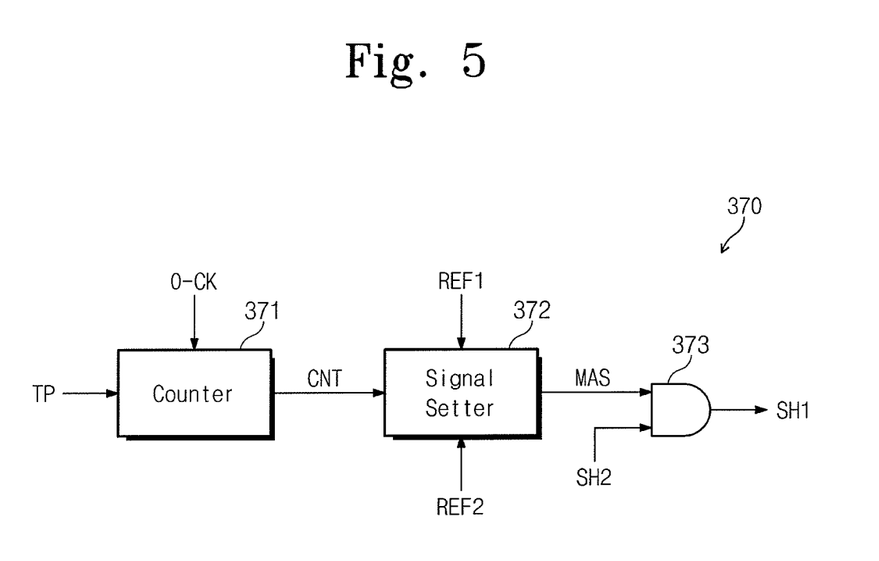
FIG. 5 is a block diagram of a sampling signal generator of FIG. 1 according to an exemplary embodiment of the present invention.
Figure 6:
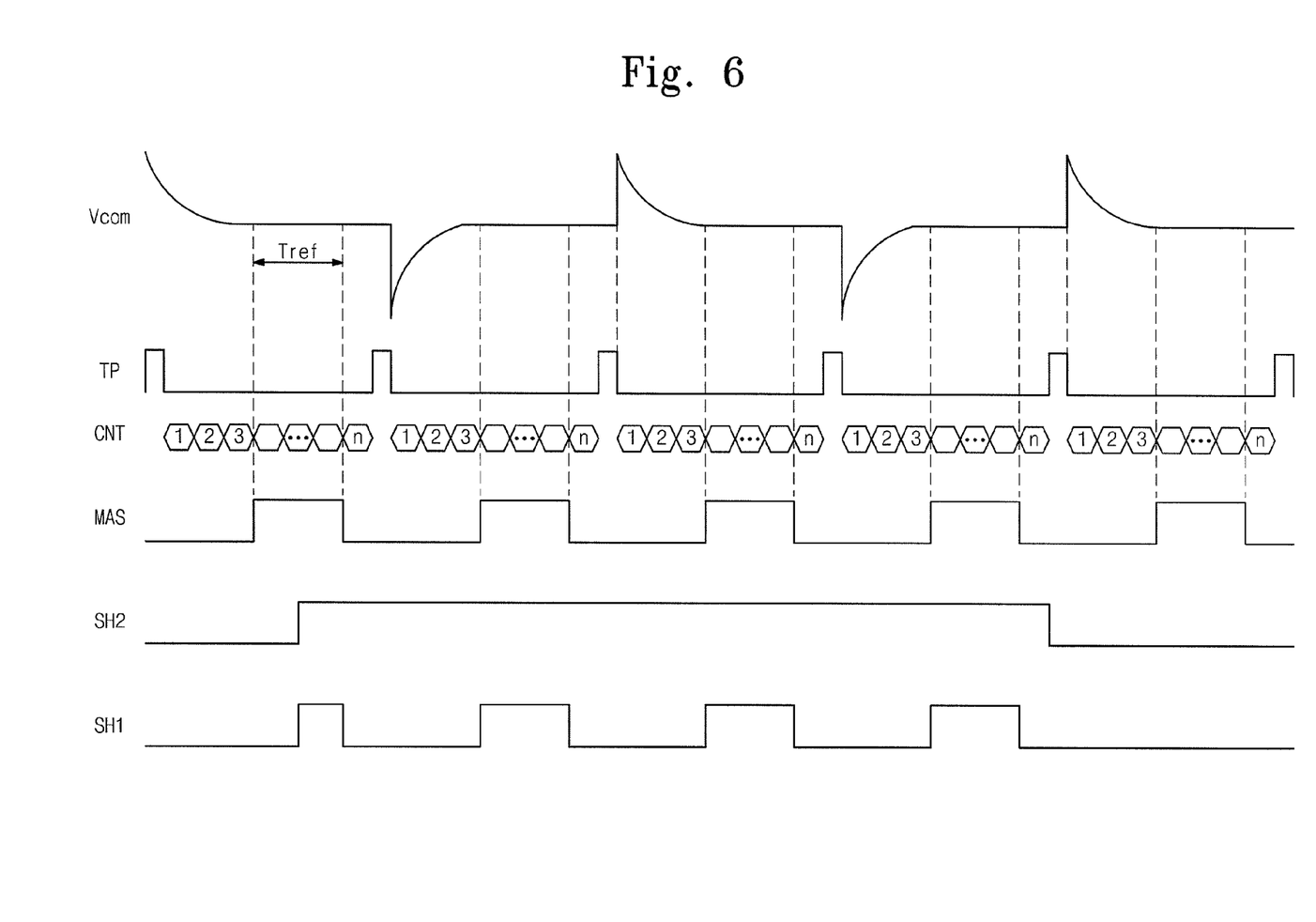
FIG. 6 is a timing diagram of exemplary signals of FIG. 5.

FIG. 5 is a block diagram of the sampling signal generator of FIG. 1 according to an exemplary embodiment of the invention, and FIG. 6 is a timing diagram of exemplary signals of FIG. 5. Referring to FIG. 5, the sampling signal generator 370 includes a counter 371, a signal setter 372, and an AND gate 373.

The counter 371 receives the output start signal TP and counts a width of one of the logic states of the output start signal TP. For example, the counter 371 may count the width of the low period of the output start signal TP (e.g., a period from a falling time of the output start signal TP to a next rising time of the output start signal TP) using an oscillator clock O-CK signal. The output start signal TP is output from the timing controller 310 shown in FIG. 1 and is provided to the data driver 330. The data driver 330 controls an output timing of the data voltages D1~Dm in response to the output start signal TP. For example, the data driver 330 outputs the data voltages D1~Dm during a logic period (e.g., a high period) of the output start signal TP. The polarity of the data voltages D1~Dm may be reversed at every period of the output start signal TP. When the polarity is reversed in this way, a ripple may occur at the common voltage Vcom, which increases or decreases the common voltage Vcom by a reference voltage level at every period of the output start signal TP according to the polarity of the data voltages D1~Dm.

The counter 371 provides a count value CNT to the signal setter 372, which is obtained by counting the width of a logic period (e.g., a low period) of the output start signal TP. The signal setter 372 compares the count value CNT with predetermined first and second reference values REF1 and REF2. For example, the signal setter 372 outputs a masking signal MAS at a logic state (e.g., a high state) when the count value CNT is larger than the first reference value REF1 and transitions the masking signal MAS to a different logic state (e.g., a low state) when the count value CNT is equal to or larger than the second reference value REF2. Therefore, the masking signal MAS may be maintained in the high state from a time point at which the count value CNT is larger than the first reference value REF1 to a time point at which the count value CNT is smaller than the second reference value REF2. The period during which the count value CNT is larger than the first reference value REF1 and smaller than the second reference value REF2 may be set as a reference level period Tref of the common voltage Vcom.

For example, the first reference value REF1 may be set to 3 (e.g., cycles of a reference signal) and the second reference value REF2 may be set to n (e.g., cycles of a reference signal), where n is a positive integer larger than 3. However, the first and second reference values REF1 and REF2 are not limited thereto as they may be set to other values.

The AND gate 373 logically ANDs the masking signal MAS provided from the signal setter 372 with the second sampling signal SH2 provided from the timing controller 310 to output the first sampling signal SH1. As shown in FIG. 4, a logic level (e.g., a high level) of the second sampling signal SH2 may be maintained during a predetermined period (e.g., the low period) of the reset signal RE. The AND gate 373 may output the first sampling signal SH1 in a logic state (e.g., a high state) when both the second sampling signal SH2 and the masking signal MAS are in a same logic state (e.g., a high state). As shown in FIG. 6, a period during which a logic period (e.g., a high period) of the second sampling signal SH2 overlaps with a same logic period (e.g., a high period) of the masking signal MAS is set as a same logic period (e.g., a high period) of the first sampling signal SH1.

A width of the logic period (e.g., the high period) of the first sampling signal SH1 may be adjusted depending on the first and second reference values REF1 and REF2. For example, if the first reference value REF1 decreases and the second reference value REF2 increases, the width of the logic period (e.g., the high period) of the first sampling signal SH1 increases. On the contrary, if the first reference value REF1 increases and the second reference value REF2 decreases, the width of the logic period (e.g., the high period) of the first sampling signal SH1 decreases.

Figure 7:
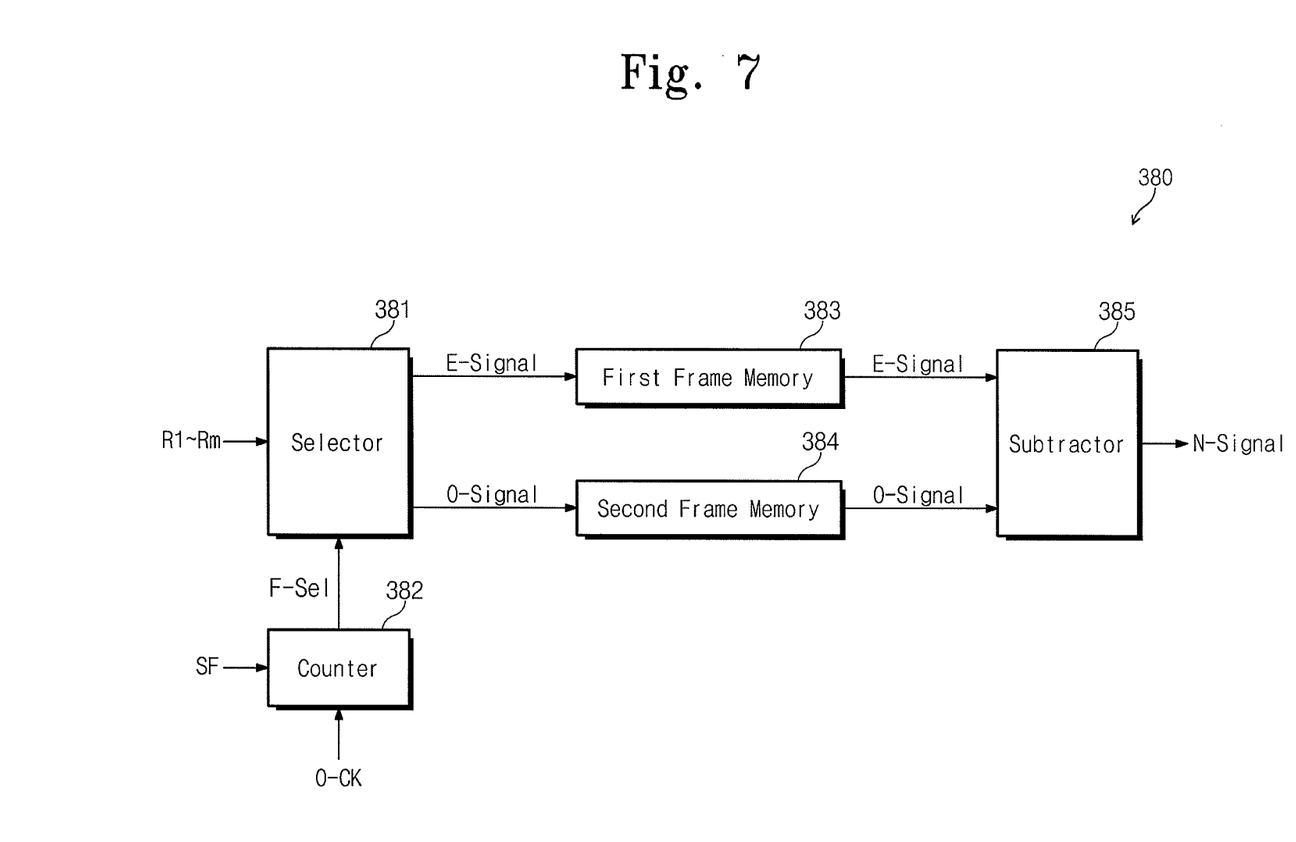
FIG. 7 is a block diagram showing a normal signal generator according to an exemplary embodiment of the present invention.
Figure 8:
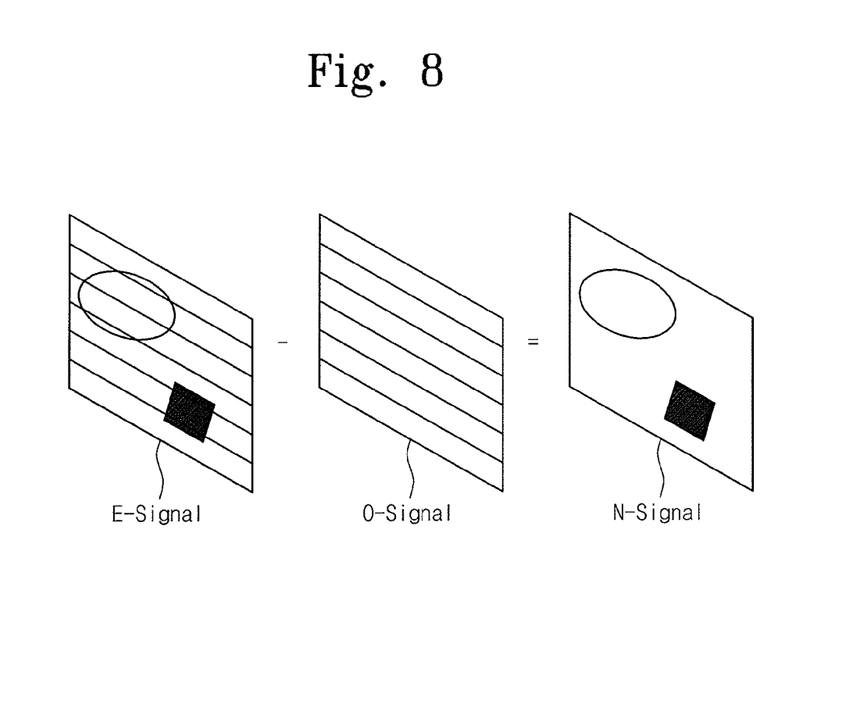
FIG. 8 is a view showing an exemplary result from a subtractor of FIG. 7.

FIG. 7 is a block diagram showing a normal signal generator according to an exemplary embodiment of the present invention, and FIG. 8 is a view showing an exemplary result from a subtractor of FIG. 7.

Referring to FIGS. 7 and 8, a normal signal generator 380 may be included in the read-out circuit 360 of FIG. 1 or may be provided with the display apparatus 300 as a separate function block from the read-out circuit 360. When the normal signal generator 380 is provided as the separate function block from the read-out circuit 360, the normal signal generator 380 may be connected or placed between the read-out circuit 360 and the control circuit 390 (shown in FIG. 1). The normal signal generator 380 includes a selector 381, a counter 382, a first frame memory 383, a second memory 384, and a subtractor 385.

The counter 382 may count the number of sensing frames SF with an oscillator clock O-CK signal. Each sensing frame may be defined by a time required to read-out all signals sensed by the sensors SN in the display panel 100. In at least one exemplary embodiment of the invention, an n-th sensing frame (e.g., n is a positive integer equal to or larger than 1) among the sensing frames may be defined as a frame in which the sensor driver 350 shown in FIG. 1 is operated, and an (n+1)-th sensing frame may be defined as a frame in which the sensor driver 350 is not operated.

The counter 382 counts the number of sensing frames SF and provides a frame selection signal F-Sel to the selector 381 according to the count value. In at least one exemplary embodiment of the invention, the frame selection signal F-Sel has a first state when the count value is even, and the frame selection signal F-Sel has a second state when the count value is odd.

The selector 381 decides whether the signals read-out by the sensors SN are stored in the first frame memory 383 or the second frame memory 384 in response to the frame selection signal F-Sel. For example, if the frame selection signal F-Sel is in the first state, the selector 381 stores the read-out signals in the first frame memory 383, and if the frame selection signal F-Sel is in the second state, the selector 381 stores the read-out signals in the second frame memory 384.

In at least one exemplary embodiment of the invention, since the sensor driver 350 is operated during the n-th sensing frame, the signals stored in the first frame memory 383 may be sensing signals E-Signal sensed by the sensors SN, and the signals stored in the second frame memory 384 may be noise signals O-Signal since the sensor driver 350 is not operated during the (n+1)-th sensing frame. The noise signals may be generated by distortion of the common voltage Vcom as shown in FIG. 6.

The subtractor 385 subtracts the noise signals O-Signal stored in the second frame memory 384 from the sensing signals E-Signal stored in the first frame memory 383 to output a normal sensing signal N-Signal. As described above, the normal sensing signal N-Signal from which noises are removed is provided to the control circuit 390 (shown in FIG. 1), so that the control circuit 390 may accurately sense a touch of a user on the display.

Figure 9:
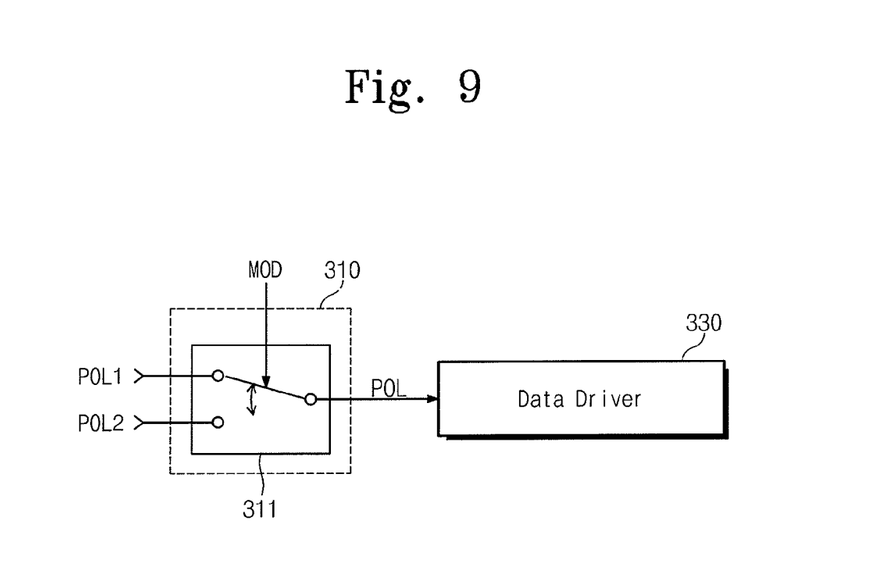
FIG. 9 is a block diagram showing a timing controller according to an exemplary embodiment of the present invention.
Figure 10:
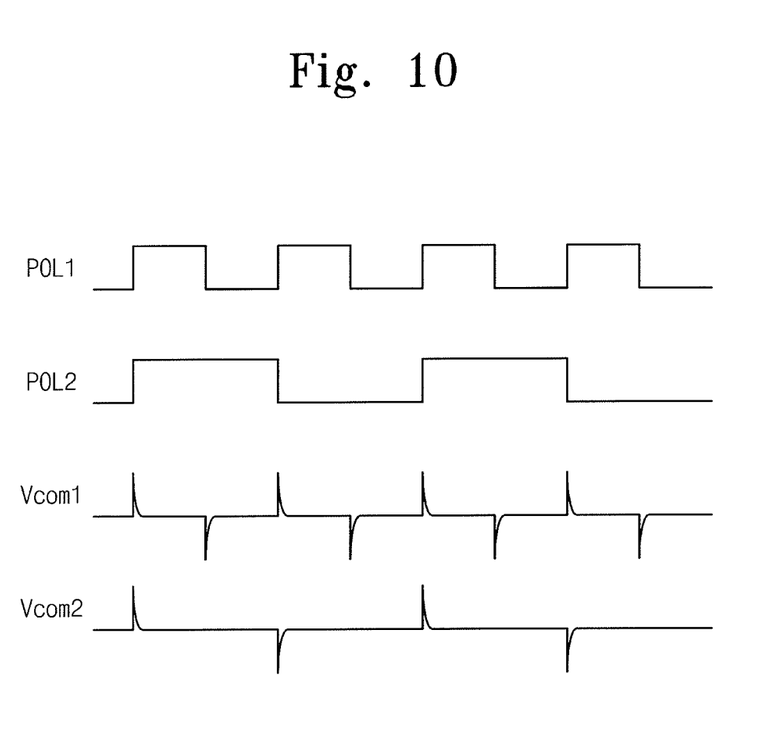
FIG. 10 is an exemplary waveform diagram showing a common voltage according to a polarity reversal signal of FIG. 9.

FIG. 9 is a block diagram showing a timing controller according to an exemplary embodiment of the present invention, and FIG. 10 is an exemplary waveform diagram showing a common voltage according to a polarity reversal signal of FIG. 9.

Referring to FIGS. 9 and 10, a timing controller 310 according to an exemplary embodiment of the invention further includes a controller 311 to control a period of the polarity reversal signal POL based on a selection signal MOD. The polarity reversal signal POL may be reversed at intervals of two or more image frame periods when the selection signal is in a first logic state (e.g., a logic high state), and the polarity reversal signal POL may be reversed at intervals of one image frame period when the selection signal is in a second logic state (e.g., a logic low state).

In at least one exemplary embodiment of the invention, the controller 311 receives a first polarity reversal signal POL1 and a second polarity reversal signal POL2 having a different period from the first polarity reversal signal POL1 and outputs one of the first and second polarity reversal signals POL1 and POL2 as the polarity reversal signal POL in response to the selection signal MOD. As shown in FIG. 10, the first polarity reversal signal POL1 may be reversed at intervals of one image frame period, and the second reversal signal POL2 may be reversed at intervals of two image frame periods.

The selection signal MOD may be varied by operations of a user. For example, if the user operates the display apparatus 300 in a scan mode in which the sensors SN are mainly used, the selection signal MOD may be transitioned to a different logic state (e.g., the logic high state).

The controller 311 outputs the first polarity reversal signal POL1 as the polarity reversal signal POL in response to the selection signal MOD at a first logic state (e.g., the logic high state) and outputs the second polarity reversal signal POL2 as the polarity reversal signal POL in response to the selection signal MOD at a second logic state (e.g., the logic low state).

As shown in FIG. 10, when the second polarity reversal signal POL2 is provided to the data driver 330, frequency of distortion at the common voltage Vcom may be decreased. Thus, when the display apparatus 300 is operated in the scan mode in which the sensors SN are mainly used, the distortion of the signals sensed by the sensors SN may be reduced by increasing the period of the polarity reversal signal POL.

Figure 11:
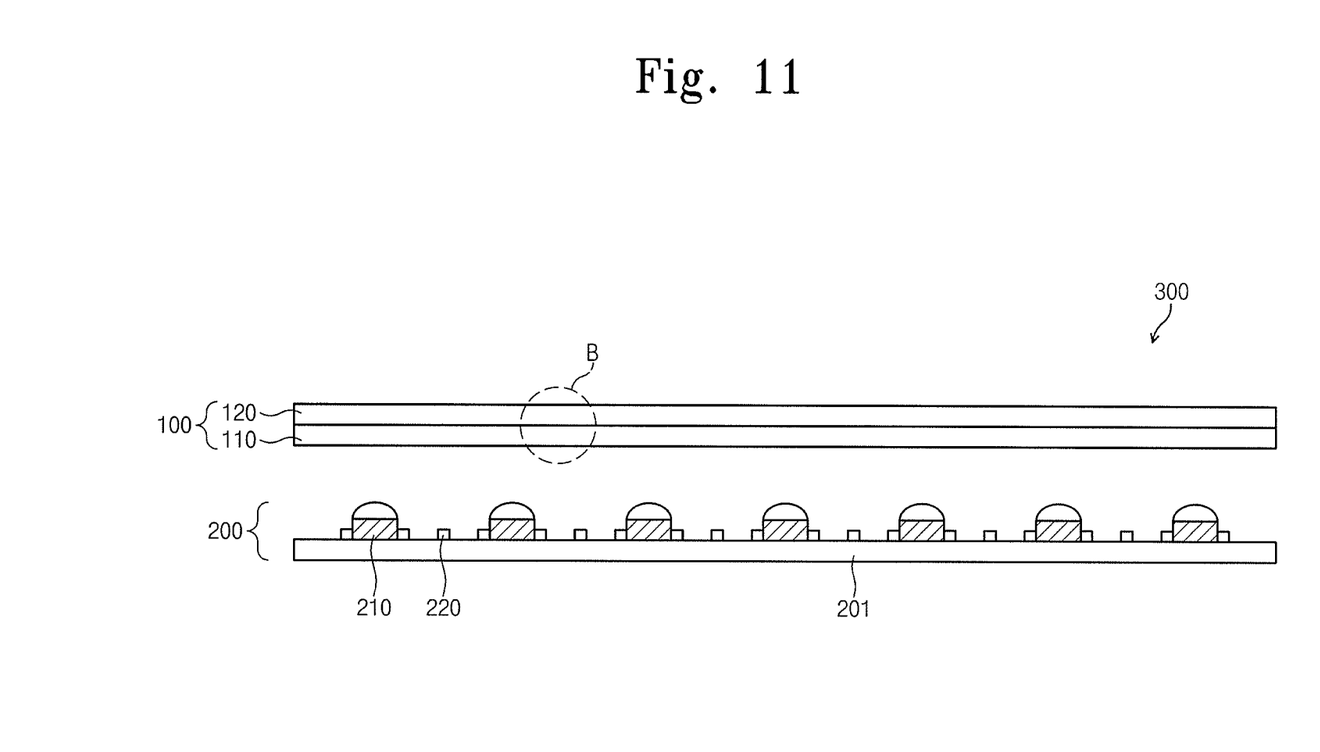
FIG. 11 is a sectional view showing a display apparatus according to an exemplary embodiment of the present invention.
Figure 12:
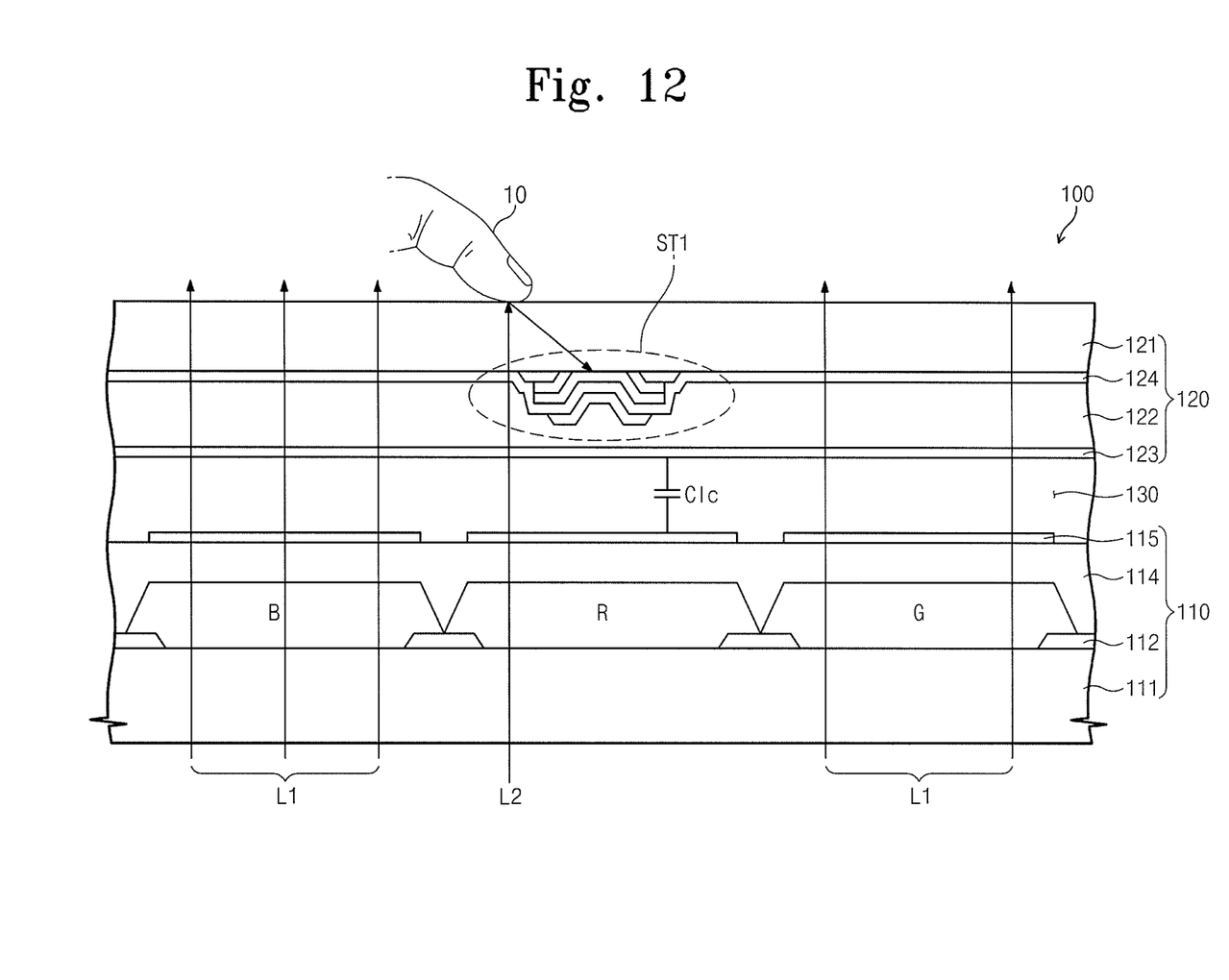
FIG. 12 is a partially-enlarged view of a portion B of FIG. 11.

FIG. 11 is a sectional view showing a display apparatus according to an exemplary embodiment of the present invention, and FIG. 12 is a partially-enlarged view of a portion B of FIG. 11.

Referring to FIG. 11, the display apparatus 300 includes a display panel 100 displaying an image thereon and a backlight unit 200 disposed below the display panel 100. The display panel 100 includes a lower substrate 110, an upper substrate 120, and a liquid crystal layer 130 disposed between the lower substrate 110 and the upper substrate 120.

The lower substrate 110 includes a first base substrate 111 and the pixels PX (shown in FIG. 1). As shown in FIG. 12, each of the pixels PX includes one color pixel of red, green, and blue (e.g., color pixels R, G, and B) and a pixel electrode 115 arranged on each of the color pixels. However, each pixel may further include a thin film transistor besides the color pixels R, G, and B and the pixel electrode 115.

A black matrix 112 is arranged between the color pixels R, G, and B that are covered by an organic insulating layer 114. Each pixel electrode 115 is arranged on the organic insulating layer 114.

The upper substrate 120 includes a second base substrate 121 facing the first base substrate 111 and the sensors SN (shown in FIG. 1) arranged on a lower surface facing the lower substrate 110 of the second base substrate 121. The sensor transistor ST1 included in each sensor SN may be an amorphous silicon transistor and may be directly formed on the second base substrate 121.

The upper substrate 120 further includes a insulating layer 122 to cover the sensors SN and a common electrode 123 arranged on the insulating layer 122 to face each pixel electrode 115. A pixel electrode 115, the common electrode 123, and the liquid crystal layer 130 may form a liquid crystal capacitor Clc.

In FIG. 12, the color pixels R, G, and B are arranged on the lower substrate 110, but the color pixels R, G, and B may be arranged on the upper substrate 120.

The backlight unit 200 includes a circuit substrate 201 disposed under the display panel 100, a plurality of first light sources 210 arranged on the circuit substrate 201 to emit a white light L1, and a plurality of second light sources 220 arranged on the circuit substrate 201 to emit an infrared ray L2.

The first and second light sources 210 and 220 may be alternately arranged with each other. As an example, one second light source 220 may be arranged between two adjacent first light sources 210 as shown in FIG. 11. In addition, the first and second light sources 210 and 220 may be a light emitting diode.

Referring to FIG. 12, the white light L1 emitted from the first light sources 210 is incident into the display panel 100 and then passes through the liquid crystal layer 130. The light transmittance of the liquid crystal layer 130 is controlled by an electric field generated between the pixel electrodes 115 and the common electrode 123. For example, the display panel 100 controls the transmittance of the white light L1 with the liquid crystal layer 130, thereby displaying an image having a desired gray-scale.

The infrared ray L2 emitted from the second light sources 220 is incident into and passes through the display panel 100. Since the infrared ray L2 passed through the display panel 100 can not be perceived by a human eye, the infrared ray L2 should not affect the ability to visually perceive the image displayed on the display panel 100.

A portion of the infrared ray L2 emitted from the second light sources 220 is reflected by the layers in the display panel 100 and another portion may pass through the display panel 100. The infrared ray L2 passed through the display panel 100 may be reflected by an object 10 (e.g., a human's finger) on the display panel 100. As an example, FIG. 12 shows the display panel 100 being touched by a user's finger 10.

The infrared ray L2 reflected by the user's finger 10 may be sensed by the sensor transistor ST1 in the display panel 100. For example, the reflected infrared ray L2 may be incident into a layer 124 of the sensor transistor ST1 (e.g., an amorphous silicon layer 124), and the photo current output from the sensor transistor ST1 is varied according to the amount of the reflected infrared ray L2.

In FIG. 12, the sensor transistor ST1 is arranged on the upper substrate 120, but the sensor transistor ST1 may be arranged on the lower substrate 110.

When the sensor transistor ST1 is arranged on the upper substrate 120, the distance between the sensor transistor ST1 and the object is closer than when the sensor transistor ST1 is arranged on the lower substrate 110. Thus, the sensitivity of the sensor transistor ST1 may be improved and the touch position may be more accurately detected. In addition, if the position of the sensor transistor ST1 arranged on the upper substrate 120 corresponds to the black matrix 112 of the lower substrate 110, the aperture ratio of the display panel 110 may be improved.

Although exemplary embodiments of the present invention have been described, it is to be understood that the present invention is not limited to these exemplary embodiments and various changes and modifications can be made by one ordinary skilled in the art within the spirit and scope of the disclosure.

What is claimed is:

1. A display apparatus comprising:
    a display panel that includes a plurality of pixels receiving a data signal having a polarity reversed with respect to a common voltage to display an image;
    a plurality of sensors that sense light and output at least one of a plurality of sensing signals;
    a read-out circuit that is charged with the sensing signals to generate charged signals in response to a first sampling signal generated during a period in which the common voltage has a predetermined reference voltage level;
    a control circuit that receives the charged signals to calculate a position on the display panel based on the received signals;
    a sensor driver that sequentially provides the scan signal to the sensors;
    a timing controller that outputs a second sampling signal having a logic high state during a predetermined period after the scan signal is generated; and
    a sampling signal generator that generates the first sampling signal based on the second sampling signal and a reference level period of the common voltage,
    wherein the first sampling signal is generated after the scan signal is generated for application to the sensors.

2. The display apparatus of claim 1, wherein the sampling signal generator comprises: a first signal generator that generates a masking signal having a logic high state corresponding to the reference level period; and a second signal generator that logically ANDs the masking signal with the second sampling signal to generate the first sampling signal.

3. The display apparatus of claim 2, wherein a high period of the masking signal has a width equal to or smaller than the reference level period of the common voltage.

4. The display apparatus of claim 2, further comprising a data driver that provides the data signal to the display panel in response to an output start signal, wherein the timing controller applies the output start signal to the data driver.

5. The display apparatus of claim 4, wherein the first signal generator comprises:
a counter that counts the output start signal from a falling time to a next rising time using a reference clock; and
a signal setter that outputs the masking signal in the logic high state during a period in which the count value is larger than a first reference value and smaller than a second reference value that is larger than the first reference value.

6. The display apparatus of claim 4, wherein the second signal generator comprises an AND gate that logically ANDs the masking signal with the second sampling signal to output the first sampling signal.

7. The display apparatus of claim 1, wherein the sensors are integrated into the display panel.

8. The display apparatus of claim 7, wherein the display panel further comprises:
a plurality of scan lines that sequentially receives the scan signal; and
a plurality of read-out lines that receives the sensing signals from the sensors.

9. The display apparatus of claim 8, wherein the read-out circuit comprises:
a plurality of operational amplifiers each receiving a corresponding sensing signal among the sensing signals from a corresponding read-out line among the read-out lines, comparing the corresponding sensing signal with a predetermined reference voltage, and increasing an output voltage thereof when the corresponding sensing signal is larger than the reference voltage;
a charging part comprising a plurality of capacitors respectively corresponding to the operational amplifiers to charge a corresponding output voltage;
a sampling part providing the output voltage to the charging part in response to the first sampling signal;
a read-out part sequentially outputting a voltage charged in each of the capacitors in response to switching signals; and
a shift register sequentially providing the switching signals to the read-out part.

10. The display apparatus of claim 1, wherein the data signal is inverted in an image frame unit.

11. The display apparatus of claim 1, wherein the sensor driver sequentially provides the scan signal to the sensors during an n-th sensing frame among a plurality of sensing frames and stops providing the scan signal during an (n+1)-th sensing frame among the sensing frames, where n is a positive integer equal to or greater than 1.

12. The display apparatus of claim 11, wherein the read-out circuit further comprises a normal signal generator that receives the sensing signals from the sensors during the n-th sensing frame, receives noise signals from the sensors during the (n+1)-th sensing frame, and subtracts the noise signals from the sensing signals to output normal sensing signals.

13. The display apparatus of claim 12, wherein the normal signal generator comprises:
a first frame memory;
a second frame memory;
a counter that counts the sensing frames to output a frame selection signal according to the count value;
a selector that stores the sensing signals received during the n-th sensing frame in the first frame memory in response to the frame selection signal and stores the noise signals received during the (n+1)-th sensing frame in the second frame memory in response to the frame selection signal; and
a subtractor that subtracts the noise signals from the sensing signals to output the normal sensing signals.

14. The display apparatus of claim 1, further comprising:
a data driver that reverses a polarity of the data signal with respect to the common voltage based on a polarity reversal signal; and
a timing controller that controls a period of the polarity reversal signal based on a selection signal.

15. The display apparatus of claim 14, wherein the selection signal is changed by an operation of a user, the polarity reversal signal reversed at intervals of two or more image frame periods when the selection signal is in a logic high state, and the polarity reversal signal is reversed at one image frame period when the selection signal is in a logic low state.

16. A display apparatus comprising:
a display panel that includes a plurality of pixels to display an image;
a plurality of sensors that sense light to output first sensing signals;
a sensor driver that sequentially provides a scan signal to the sensors during an n-th sensing frame among a plurality of sensing frames and stops providing the scan signal during an (n+1)-th sensing frame among the sensing frames;
a normal signal generator that receives the first sensing signals from the sensors during the n-th sensing frame, receives noise signals from the sensors during the (n+1)-th sensing frame, and subtracts the noise signals from the first sensing signals to output second sensing signals; and
a control circuit that receives the second sensing signals to calculate a position on the display panel based on the second sensing signals, where n is a positive integer equal to or greater than 1,
wherein the normal signal generator counts the sensing frames to determine whether a current sensing frame is odd or even to determine whether received data is a first sensing signal or a noise signal, and
wherein the normal signal generator comprises:
a first frame memory;
a second frame memory;
a counter that counts the sensing frames to output a frame selection signal according to the count value;
a selector that stores the first sensing signals in the first frame memory during the n-th sensing frame in response to the frame selection signal and stores the noise signals in the second frame memory during the (n+1)-th sensing frame in response to the frame selection signal; and
a subtractor that subtracts the noise signals from the first sensing signals to output the second sensing signals.

17. A display apparatus comprising:
a display panel that comprises a plurality of pixels each receiving a data signal to display an image;
a data driver that reverses a polarity of the data signal with respect to the common voltage based on a polarity reversal signal;
a timing controller that controls a period of the polarity reversal signal based on a selection signal;
a plurality of sensors that sense light to output sensing signals;

a read-out circuit that receives the sensing signals from the sensors;
a sensor driver that sequentially provides the scan signal to the sensors during an n-th sensing frame among a plurality of sensing frames and stops providing the scan signal during an (n+1)-th sensing frame among the sensing frames, where n is a positive integer equal to or greater than 1; and
a control circuit that receives the sensing signals from the read-out circuit to calculate a position on the display panel based on the sensing signals,
wherein the read-out circuit further comprises a normal signal generator that receives the sensing signals from the sensors during the n-th sensing frame, receives noise signals from the sensors during the (n+1)-th sensing frame, and subtracts the noise signals from the sensing signals to output normal sensing signals, and
wherein the normal signal generator comprises:
a first frame memory;
a second frame memory;
a counter that counts the sensing frames to output a frame selection signal according to the count value;
a selector that stores the sensing signals received during the n-th sensing frame in the first frame memory in response to the frame selection signal and stores the noise signals received during the (n+1)-th sensing frame in the second frame memory in response to the frame selection signal; and
a subtractor that subtracts the noise signals from the sensing signals to output the normal sensing signals.

18. The display apparatus of claim 17, wherein the selection signal is changed by an operation of a user, the polarity reversal signal is reversed at intervals of two or more image frame periods when the selection signal is in a logic high state, and the polarity reversal signal is reversed at one image frame period when the selection signal is in a logic low state.

* * * * *